US007153193B1

(12) United States Patent
Kurita et al.

(10) Patent No.: US 7,153,193 B1
(45) Date of Patent: Dec. 26, 2006

(54) SYSTEM AND APPARATUS FOR SELECTIVELY SENSING AND REMOVING ASPERITIES FROM HARD DISK DRIVE MEDIA UTILIZING ACTIVE THERMALLY CONTROLLED FLYING HEIGHTS

(75) Inventors: Masayuki Kurita, Kanagawa-ken (JP); Remmelt Pit, Cupertino, CA (US); Shozo Saegusa, Ibaragi-ken (JP); Toshiya Shiramatsu, Kanagawa-ken (JP); Mike Suk, Palo Alto, CA (US); Hideaki Tanaka, Kanagawa-ken (JP)

(73) Assignee: Hitachi Global Storage Netherlands B.V., Amsterdam (NL)

( * ) Notice: Subject to any disclaimer, the term of this patent is extended or adjusted under 35 U.S.C. 154(b) by 0 days.

(21) Appl. No.: 11/253,102

(22) Filed: Oct. 18, 2005

(51) Int. Cl.
*B24B 1/00* (2006.01)
(52) U.S. Cl. .............................. 451/8; 451/10; 451/11; 451/41; 451/317; 360/122; 360/235.4; 73/105; 29/603.16; 29/90.01
(58) Field of Classification Search .................. 451/8, 451/9, 10, 11, 41, 163, 317; 360/75, 122, 360/22, 234, 234.3, 235; 73/105; 29/603.07, 29/603.16, 90.01
See application file for complete search history.

(56) References Cited

U.S. PATENT DOCUMENTS

| 5,423,207 | A | 6/1995 | Flechsig et al. | |
|---|---|---|---|---|
| 5,808,184 | A | 9/1998 | Boutaghou et al. | |
| 5,991,113 | A | 11/1999 | Meyer et al. | |
| 6,052,249 | A | * | 4/2000 | Abraham et al. ............. 360/59 |
| 6,073,486 | A | * | 6/2000 | Packard et al. ................ 73/105 |
| 6,262,572 | B1 | * | 7/2001 | Franco et al. ................ 324/212 |
| 6,296,552 | B1 | | 10/2001 | Boutaghou et al. |
| 6,311,551 | B1 | * | 11/2001 | Boutaghou .................... 73/105 |
| 6,366,416 | B1 | | 4/2002 | Meyer et al. |
| 6,419,551 | B1 | | 7/2002 | Smith |
| 6,503,132 | B1 | | 1/2003 | Ekstrum et al. |
| 6,526,639 | B1 | | 3/2003 | Duan et al. |
| 6,577,466 | B1 | | 6/2003 | Meyer et al. |

(Continued)

FOREIGN PATENT DOCUMENTS

| JP | 56044123 | 4/1981 |
|---|---|---|
| JP | 62184679 | 8/1987 |

(Continued)

OTHER PUBLICATIONS

"Closed Loop Optimal Tandem Burnish/Glide Process With Variable Load" IBM Anon. Disc. Nov. 1988.

(Continued)

*Primary Examiner*—Eileen P. Morgan

(57) ABSTRACT

A system for selectively sensing and removing asperities from hard disk drive disk is disclosed. The system includes a test stand supporting the disk, the test stand having at least one suspension for flying over a surface of the disk. The system also includes a glide pad coupled to the at least one suspension for flying over the surface and locating asperities. A PZT sensor is coupled to the glide pad for sensing and mapping asperities on the surface of the disk. A burnish pad is coupled to the at least one suspension for wearing-away sensed and mapped asperities on the surface of the disk and a thermal fly height controller is coupled to the burnish pad for protruding the burnish pad when it is proximate to one of the mapped asperities for facilitating the wearing-away of the mapped asperity.

21 Claims, 10 Drawing Sheets

U.S. PATENT DOCUMENTS

| | | |
|---|---|---|
| 6,580,572 B1 | 6/2003 | Yao et al. |
| 6,666,076 B1 | 12/2003 | Lin et al. |
| 6,697,223 B1 * | 2/2004 | Lewis et al. .............. 360/235.7 |
| 6,775,103 B1 | 8/2004 | Kang et al. |

FOREIGN PATENT DOCUMENTS

| | | |
|---|---|---|
| JP | 63142524 | 6/1988 |
| JP | 1216769 | 8/1989 |
| JP | 1310860 | 12/1989 |
| JP | 1310861 | 12/1989 |
| JP | 5028472 | 2/1993 |

OTHER PUBLICATIONS

"Magnetic Head with Piezoelectric Positioning" IBM TDB Oct. 1973, p. 1429.

"Intelligent Burnishing System using a Cognizant Burnish Head" IBM Anon. Disc. Apr. 1987.

"Magnetoresistive Sensing of Surface Burnishing" IBM TDB, Jun. 1975, p. 243.

* cited by examiner

SYSTEM AND APPARATUS FOR SELECTIVELY SENSING AND REMOVING ASPERITIES FROM HARD DISK DRIVE MEDIA UTILIZING ACTIVE THERMALLY CONTROLLED FLYING HEIGHTS

TECHNICAL FIELD

The present invention relates to the field of testing hard disk drive media, and more particularly to a system and apparatus for removing loose particles and asperities from hard disk drive media utilizing thermal flying height control.

BACKGROUND ART

Hard disk drives are used in almost all computer system operations. In fact, most computing systems are not operational without some type of hard disk drive to store the most basic computing information such as the boot operation, the operating system, the applications, and the like. In general, the hard disk drive is a device which may or may not be removable, but without which the computing system will generally not operate.

The basic hard disk drive model was established approximately 50 years ago and resembles a phonograph. That is, the hard drive model includes a storage disk or hard disk that spins at a designed rotational speed. An actuator arm with a suspended slider is utilized to reach out over the disk. The arm carries an assembly that includes a slider, a suspension for the slider and in the case of the load/unload drive, a nose portion for directly contacting the holding ramp during the load/unload cycle. The slider also includes a head assembly including a magnetic read/write transducer or head for reading/writing information to or from a location on the disk. The complete assembly, e.g., the suspension and slider, is called a head gimbal assembly (HGA).

In operation, the hard disk is rotated at a set speed via a spindle motor assembly having a central drive hub. Additionally, there are tracks evenly spaced at known intervals across the disk. When a request for a read of a specific portion or track is received, the hard disk aligns the head, via the arm, over the specific track location and the head reads the information from the disk. In the same manner, when a request for a write of a specific portion or track is received, the hard disk aligns the head, via the arm, over the specific track location and the head writes the information to the disk.

Over the years, the disk and the head have undergone great reductions in their size. Much of the refinement has been driven by consumer demand for smaller and more portable hard drives such as those used in personal digital assistants (PDAs), MP3 players, and the like. For example, the original hard disk drive had a disk diameter of 24 inches. Modern hard disk drives are much smaller and include disk diameters 3.5 to 1 inches (and even smaller than 1 inch). Advances in magnetic recording are also primary reasons for the reduction in size. In addition to reduction in radial size, the thickness of the disks has decreased and the roughness decreased.

In the manufacturing process for the disks, a magnetic layer is sputtered onto the surface of the disk. A carbon layer is then sputtered onto the magnetic layer as a protectant layer, and then a polymer lubricant is applied to seal the surface. Following the sputtering of the polymer layer, the disk is placed in a test stand or spin stand for the removal of any loose particles that may be present and any asperities (protruding defects) that might be present. These asperities typically have a width or radius of approximately 1 micrometer and a height of 20 to 100 nanometers, and can be smaller or larger.

The method that has been conventionally used to remove these loose particles and asperities used a single burnish head (BH) for removal of both the loose particles and the asperities. This BH resided on a slider that was effectively in contact with the disk and was continuously riding on the disk as the disk was spun in the test stand. Because the roughness of the disk was very high (Atomic Force Microscopy (AFM) showed a standard deviation greater than 10 Angstroms), and the pressure generated under the air-bearing surface (ABS) was low, the BH was able to follow the disk surface and effectively remove defects and particles.

However, as disks have become smoother (AFM standard deviation less than 6 Angstroms), the contact area has increased causing high friction between the BH and the disk surface such that an adhesion problem has developed. This in turn leads to bouncing of the BH as it breaks loose. Because the ABS pressure is low, the main excitation is the suspension of the slider which causes a bouncing frequency of only a few kHz. Thus, the older BH did not cover the full disk surface well.

More recent BH designs use "tape" or "pad" burnishing in which the BHs have a strip of abrasive material on a pad and they fly at a height of approximately 10 nm. These BHs are effective for removing loose particles from the disk surface without damaging the disk, but are not so effective in removing asperities.

An even more recent approach is to separate particle removal and asperity removal into two separate processes. First the disk is burnished to remove asperities by rotating the disk on the spin stand of a test station with the pad pushing the abrasive tape strip onto the disk surface to wear away any asperities. Secondly, a specially designed slider flies above the disk surface at approximately 10 nm to "sweep" the surface and remove loose particles.

These processes are then followed by a glide height test. The glide height test is typically performed in a different test station that has a PZT piezo-electric sensor riding on a slider that is flown above the disk surface to determine if any asperities still reside on the disk. If so, the current solution is to rework any disk that fails the glide height test by pad burnishing it a second time at a different test station.

SUMMARY

Embodiments of the present invention include a system for selectively sensing and removing asperities from hard disk drive disk. The system includes a test stand supporting the disk, the test stand having at least one suspension for flying over a surface of the disk. The system also includes a glide pad coupled to the at least one suspension for flying over the surface and locating asperities. A PZT sensor is coupled to the glide pad for sensing and mapping asperities on the surface of the disk. A burnish pad is coupled to the at least one suspension for wearing-away sensed and mapped asperities on the surface of the disk and a thermal flying height actuator is coupled to the burnish pad for protruding the burnish pad when it is proximate to one of the mapped asperities for facilitating the wearing-away of the mapped asperity.

DETAILED DESCRIPTION

Reference will now be made in detail to the alternative embodiments of the present invention. While the invention will be described in conjunction with the alternative embodiments, it will be understood that they are not intended to limit the invention to these embodiments. On the contrary, the invention is intended to cover alternatives, modifications and equivalents, which may be included within the spirit and scope of the invention as defined by the appended claims.

Furthermore, in the following detailed description of the present invention, numerous specific details are set forth in order to provide a thorough understanding of the present invention. However, it will be recognized by one of ordinary skill in the art that the present invention may be practiced without these specific details. In other instances, well known methods, procedures, components, and circuits have not been described in detail as not to unnecessarily obscure aspects of the present invention.

The discussion will begin with an overview of a hard disk drive and an electrical lead suspension (ELS) in conjunction with its operation within the hard disk drive and components connected therewith. The discussion will then focus in particular on embodiments of an apparatus and method for utilizing thermal flying height control during the disk manufacture process for removing loose particles and asperities from the disks, thereby introducing a clean, smooth disk surface, having its protective coatings in tact, into the hard disk drive.

In general, embodiments of the present invention reduce the detrimental aspects of loose particles and asperities on the disk surface. For example, when a flying slider contacts disk asperities, the impact energy can result in vibration of the flexure nose. In some cases, the vibration of the flexure nose reaches a resonance frequency resulting in unstable flying of the slider. By reducing the asperities and loose particles present on the disk, the stability of the flight of the slider can be significantly increased.

Figure 1:
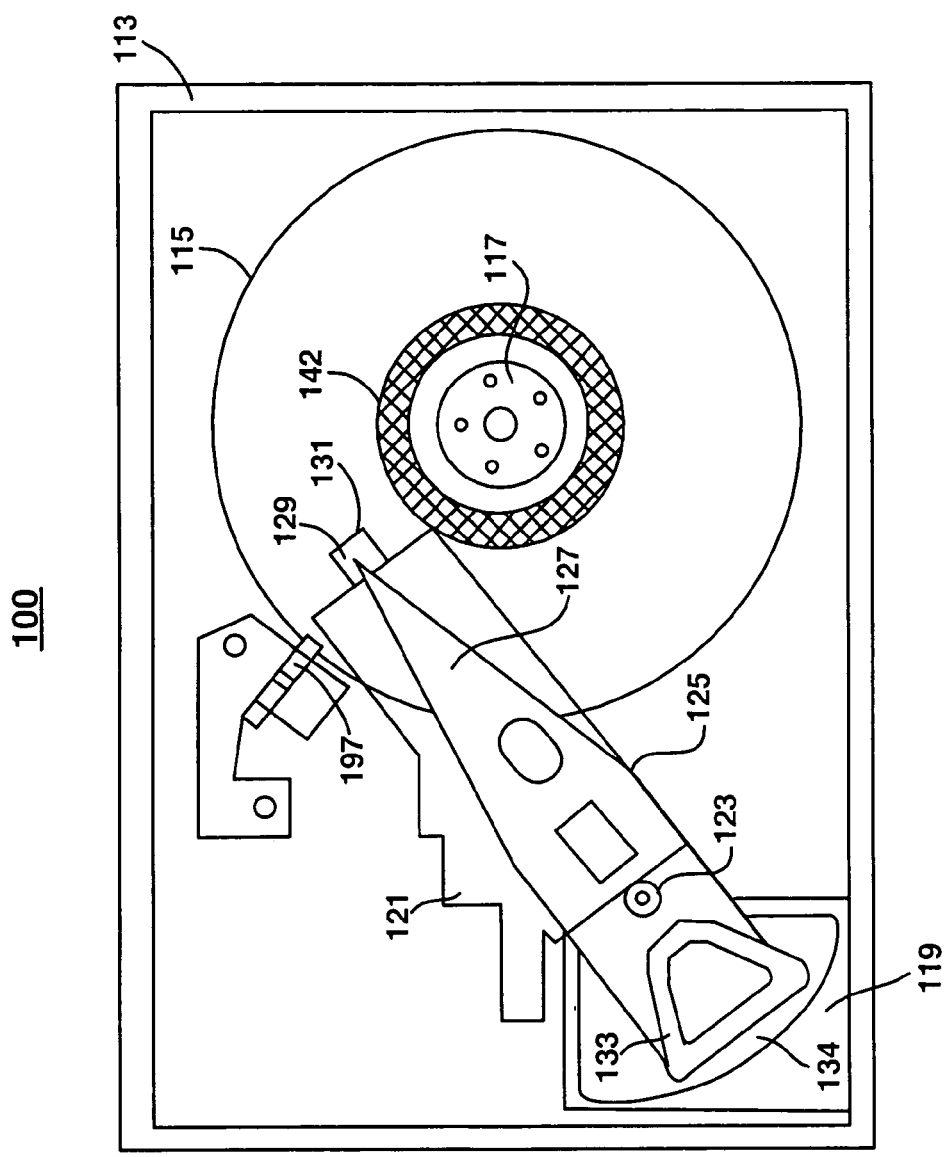
FIG. 1 is a schematic top plan view of a hard disk drive, in accordance with one embodiment of the present invention.

With reference now to FIG. 1, a schematic drawing of one embodiment of an information storage system comprising a magnetic hard disk file or drive 100 for a computer system is shown. Embodiments of the invention are well suited for utilization on a plurality of hard disk drives. The utilization of the driver of FIG. 1 is merely one of a plurality of disk drives that may be utilized in conjunction with the present invention. For example, in one embodiment the hard disk drive 100 would use load/unload (L/UL) techniques with a ramp 197 and a nose limiter. In another embodiment, the drive 100 is a non L/UL drive, for example, a contact start-stop (CSS) drive having a textured landing zone 142 away from the data region of disk 115.

In the exemplary FIG. 1, drive 100 has an outer housing or base 113 containing a disk pack having at least one media or magnetic disk 115. Prior to being inserted into drive 100, magnetic disk 115 is tested for irregularities, referred to as asperities, on its surfaces. Any asperities that are identified are, according to embodiments of the present invention, sensed and mapped and then selectively removed by a burnishing pad that is coupled to a thermal flying height device located on a slider on a test or spin stand. Once installed in drive 100, a spindle motor assembly having a central drive hub 117 rotates the disk or disks 115. An actuator comb 121 comprises a plurality of parallel actuator arms 125 (one shown) in the form of a comb that is movably or pivotally mounted to base 113 about a pivot assembly 123. A controller 119 is also mounted to base 113 for selectively moving the comb of arms 125 relative to disk 115.

In the embodiment shown, each arm 125 has extending from it at least one cantilevered ELS 127. It should be understood that ELS 127 may be, in one embodiment, an integrated lead suspension (ILS) that is formed by a subtractive process. In another embodiment, ELS 127 may be formed by an additive process, such as a Circuit Integrated Suspension (CIS). In yet another embodiment, ELS 127 may be a Flex-On Suspension (FOS) attached to base metal or it may be a Flex Gimbal Suspension Assembly (FGSA) that is attached to a base metal layer. The ELS may be any form of lead suspension that can be used in a Data Access Storage Device, such as a HDD. A magnetic read/write transducer 131 or head is mounted on a slider 129 which is secured to a flexible structure called "flexure" that is part of ELS 127. The read/write heads magnetically read data from and/or magnetically write data to disk 115. The level of integration called the head gimbal assembly is the head and the slider 129, which is mounted on suspension 127. The slider 129 is usually bonded to the end of ELS 127.

ELS 127 has a spring-like quality, which biases or presses the air-bearing surface of the slider 129 against the disk 115 to cause the slider 129 to fly at a precise distance from the disk as the disk rotates and air bearing develops pressure. ELS 127 has a hinge area that provides for the spring-like quality, and a flexing interconnect (or flexing interconnect) that supports read and write traces through the hinge area. A voice coil 133, free to move within a conventional voice coil motor magnet assembly 134 (top pole not shown), is also mounted to arms 125 opposite the head gimbal assemblies. Movement of the actuator comb 121 by controller 119 causes the head gimbal assemblies to move along radial arcs across tracks on the disk 115 until the heads settle on their set target tracks. The head gimbal assemblies operate in a conventional manner and always move in unison with one another, unless drive 100 uses multiple independent actuators (not shown) wherein the arms can move independently of one another.

In general, the load/unload drive refers to the operation of the ELS 127 with respect to the operation of the disk drive. That is, when the disk 115 is not rotating, the ELS 127 is unloaded from the disk. For example, when the disk drive is not in operation, the ELS 127 is not located above the disk 115 but is instead located in a holding location on L/UL ramp 197 away from the disk 115 (e.g., unloaded). Then, when the disk drive is operational, the disk(s) are spun up to speed, and the ELS 127 is moved into an operational location above the disk(s) 115 (e.g., loaded). In so doing, the deleterious encounters between the slider and the disk 115 during non-operation of the HDD 111 are greatly reduced. Moreover, due to the movement of the ELS 127 to a secure off-disk location during non-operation, the mechanical shock robustness of the HDD is greatly increased.

Figure 2A:
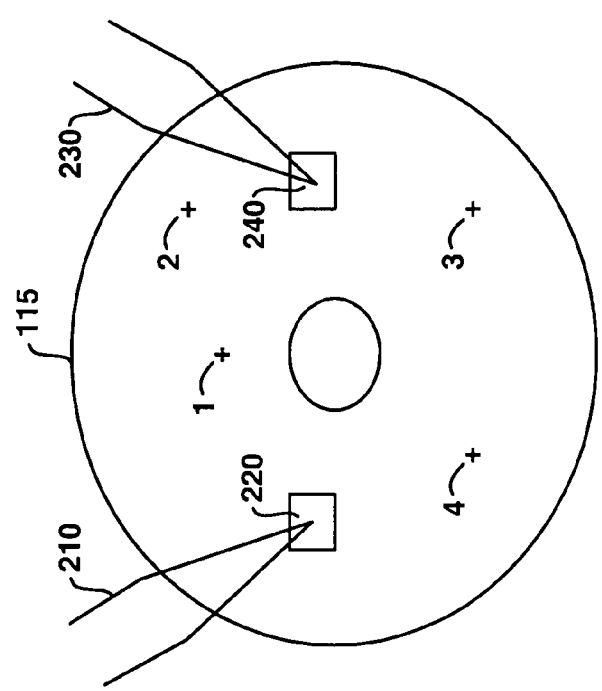
FIG. 2A is an illustration of a top view of an exemplary disk on a test stand having two sliders, according to one embodiment of the present invention.
Figure 2B:
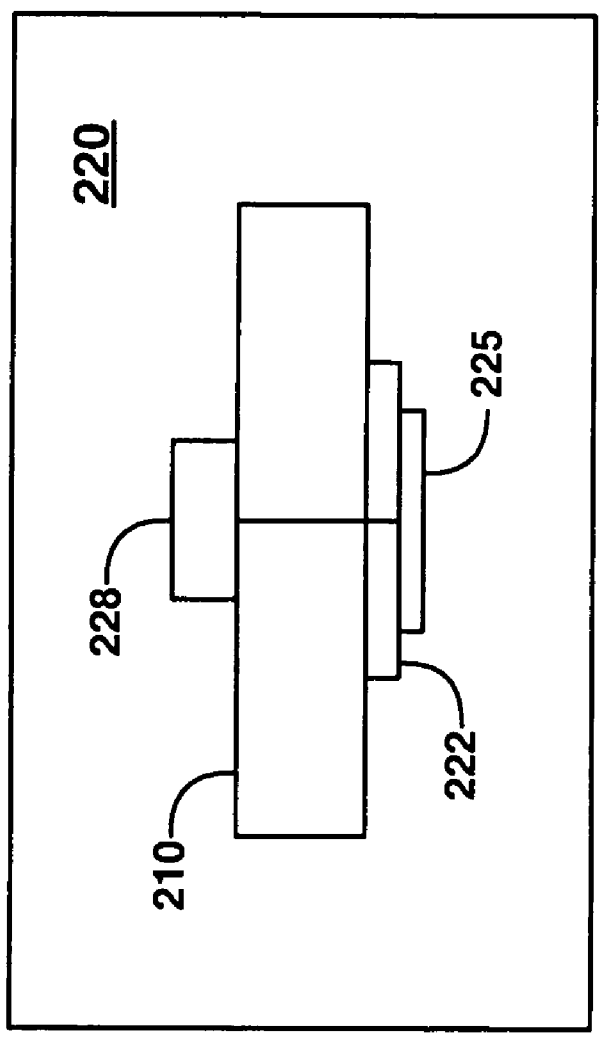
FIG. 2B is an illustration of an end elevation view of an exemplary glide slider on a slider, in accordance with an embodiment of the present invention.
Figure 2C:
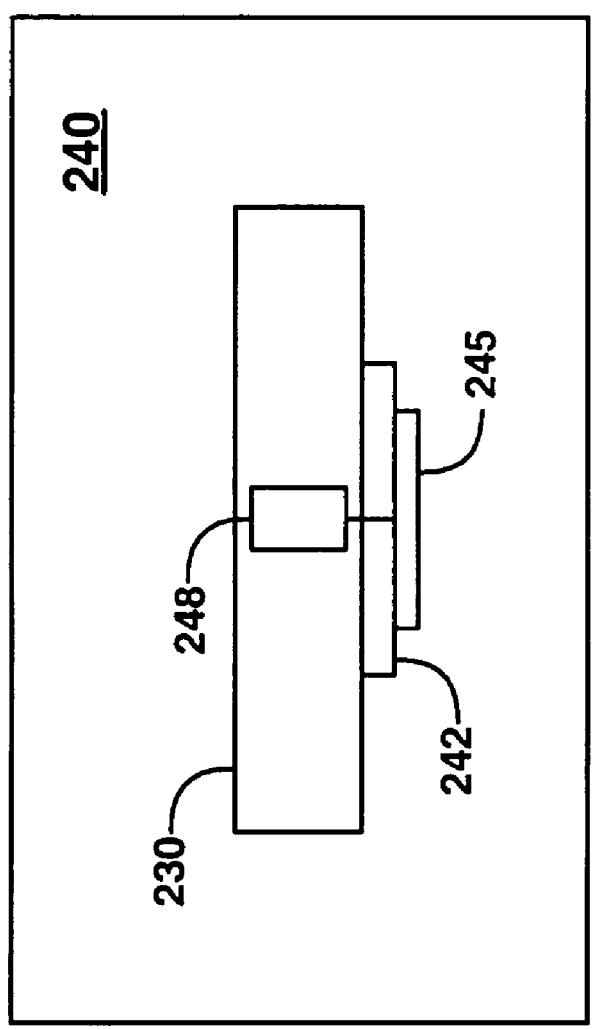
FIG. 2C is an illustration of an end elevation view of an exemplary burnish slider according to an embodiment of the present invention.

Referring to FIGS. 2A, 2B and 2C, FIG. 2A is an illustration of a top view 200 of an exemplary disk 115 on a test stand (not shown), also referred to as a spin stand, having two suspensions 210 and 230, according to one embodiment of the present invention. FIG. 2B is an illustration of an end elevation view 220 of an exemplary glide slider 222 on suspension 210, in accordance with an embodiment of the present invention. FIG. 2C is an illustration of an end elevation view 240 of an exemplary burnish slider 242 on suspension 230, according to an embodiment of the present invention. FIGS. 2A, 2B and 2C are discussed herein in concert.

According to one embodiment of the present invention, glide slider 222 resides at location 220 for flying over disk 115. Glide slider 222 is coupled to the air-bearing surface (ABS) of suspension 210 and has an air-bearing surface of its own and a glide pad 225 that is coupled to a piezo-electric PZT sensor 228 that rides on the non-ABS surface of suspension 210. As glide slider 222 flies over disk 115 and glide pad 225 encounters asperities, such as asperities 1, 2, 3 and 4, PZT sensor 228 senses and maps the locations of asperities 1, 2, 3 and 4.

Referring still to FIGS. 2A, 2B and 2C, according to an embodiment of the present invention, suspension 230 has a burnish slider 242 at location 240 for selectively wearing away mapped asperities 1, 2, 3 and 4. Burnish pad 245, coupled to burnish slider 242, is coupled to a thermal flying height actuator 248. Burnish pad 245 may be comprised of a strip of burnishing material overlaying a material (e.g., nickel or tungsten) having a relatively high coefficient of thermal expansion. Thermal flying height actuator 248 comprises a heater coupled, through burnish slider 242 (shown by dotted line 247), to the material having a high coefficient of thermal expansion underlying burnish pad 245. Thermal flying height actuator 248 can heat the underlying material causing it to expand and protrude burnish pad 245 when it is proximate to one of mapped asperities 1, 2, 3 or 4. The thermal flying height actuator 248, then, facilitates the selective wearing-away of the mapped asperity 1, 2, 3 or 4 and avoids the necessity of burnishing the entire surface of disk 115, thereby avoiding potential deleterious effects that might result from adhesion and subsequent skipping and bouncing of burnish pad 245 on the surface of disk 115.

In another embodiment, burnish slider 242 is flown over disk 115, having thermal flying height actuator 248 deactivated, for attracting and removing loose particles that might reside on disk 115.

According to one embodiment of the present invention, following the mapping and wearing away of asperities 1, 2, 3 and 4 on one surface of disk 115, disk 115 is flipped over and its other (second) surface is flown over by suspension 210 for sensing and mapping asperities on the second surface. The mapping of asperities is then followed, as on the first surface, by selectively wearing away any sensed and mapped asperities.

In another embodiment, referring to FIGS. 2A, 2B and 2C, there is a duplicate set of suspensions 210 and 230, mounted so as to fly over the second surface, sensing, mapping and wearing away asperities at the same time as suspensions 210 and 230 are flying over the first surface, thereby reducing the time required to remove asperities from both surfaces of disk 115.

In yet another embodiment, suspension 210 and suspension 230 are located on separate test stands, so that disk 115 is transferred between test stands for separate mapping of asperities and burnishing of asperities.

Figure 3A:
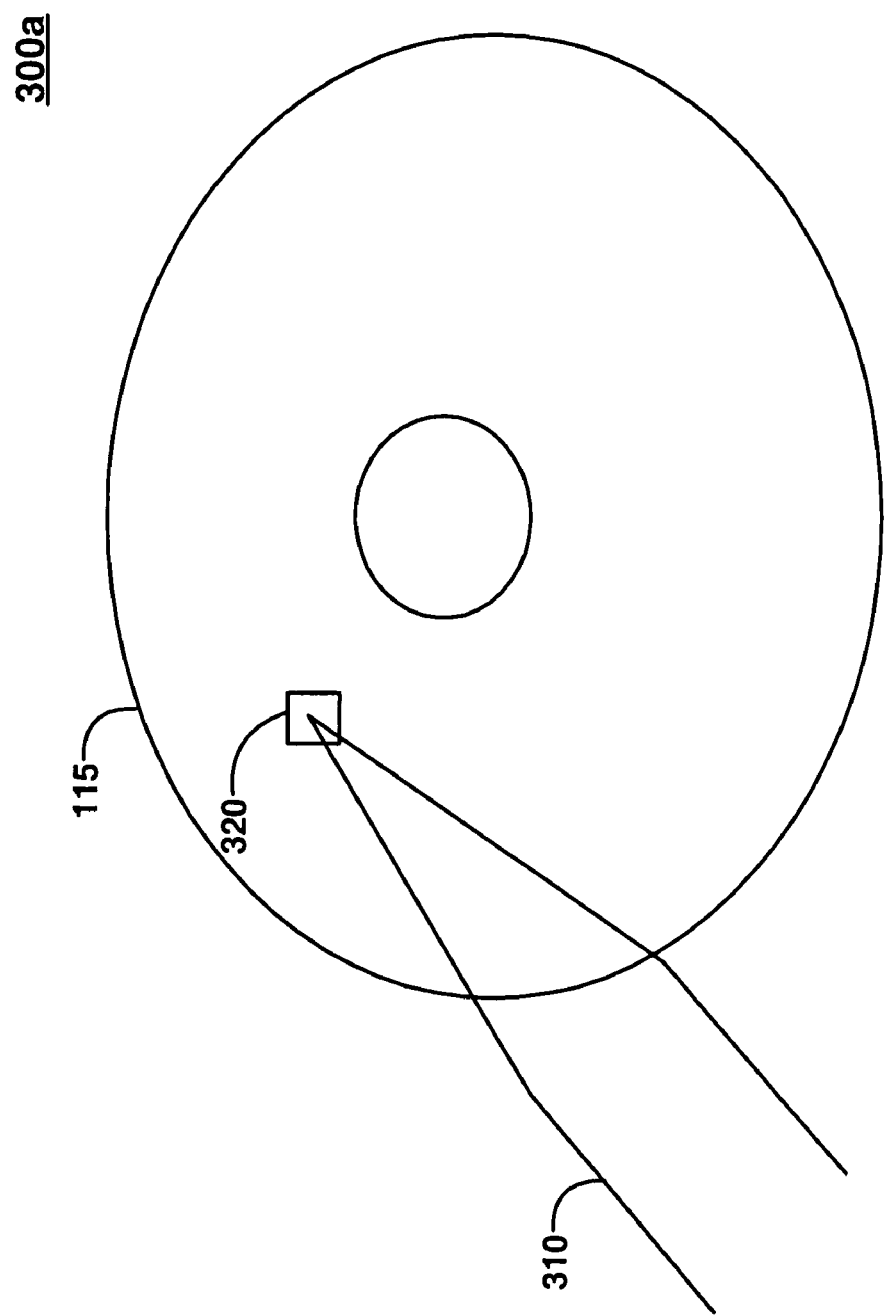
FIG. 3A is an illustration of a top view of an exemplary disk on a test stand having a single combination glide/burnish slider, in accordance with one embodiment of the present invention.
Figure 3B:
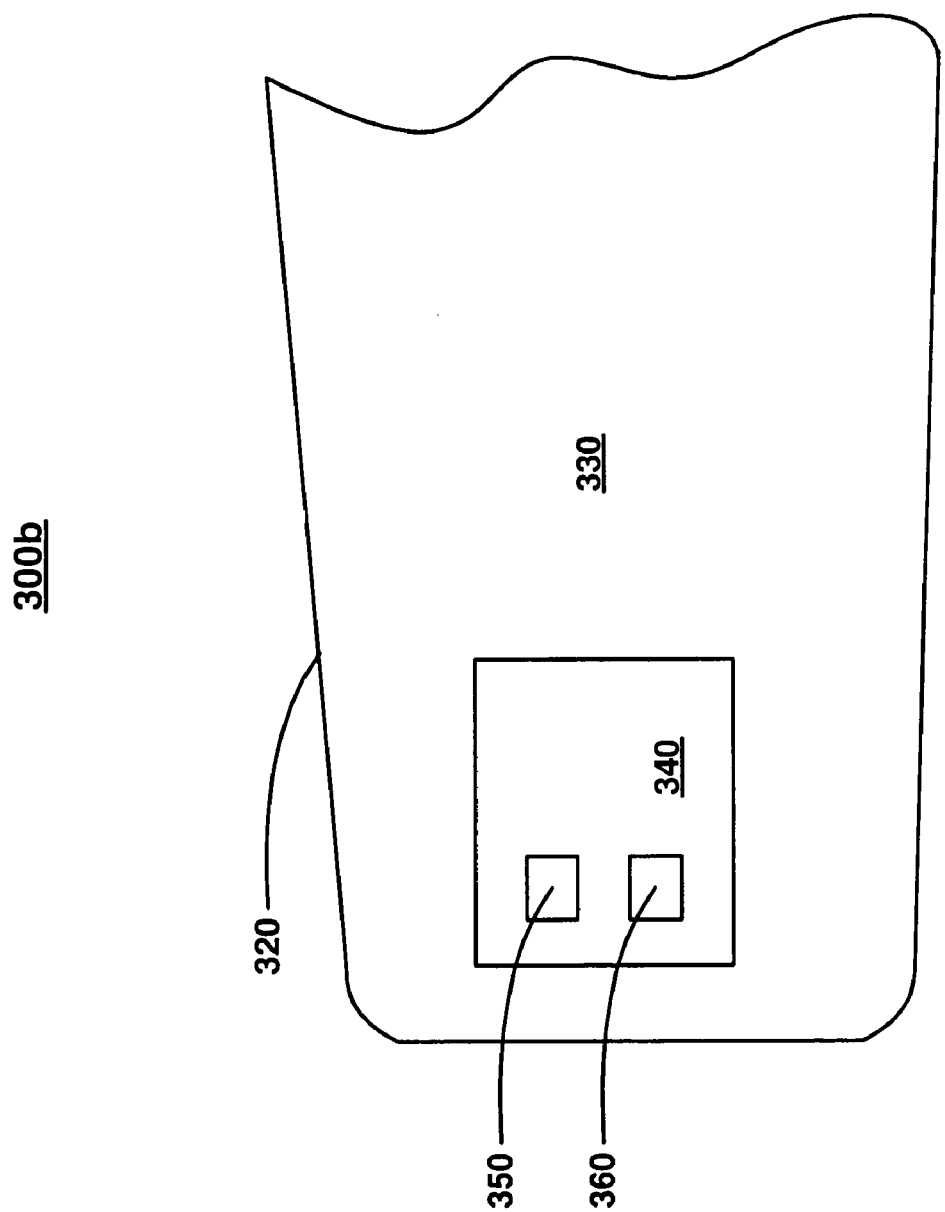
FIG. 3B is an illustration of a bottom view of an exemplary combination glide/burnish slider, in accordance with one embodiment of the present invention.
Figure 3C:
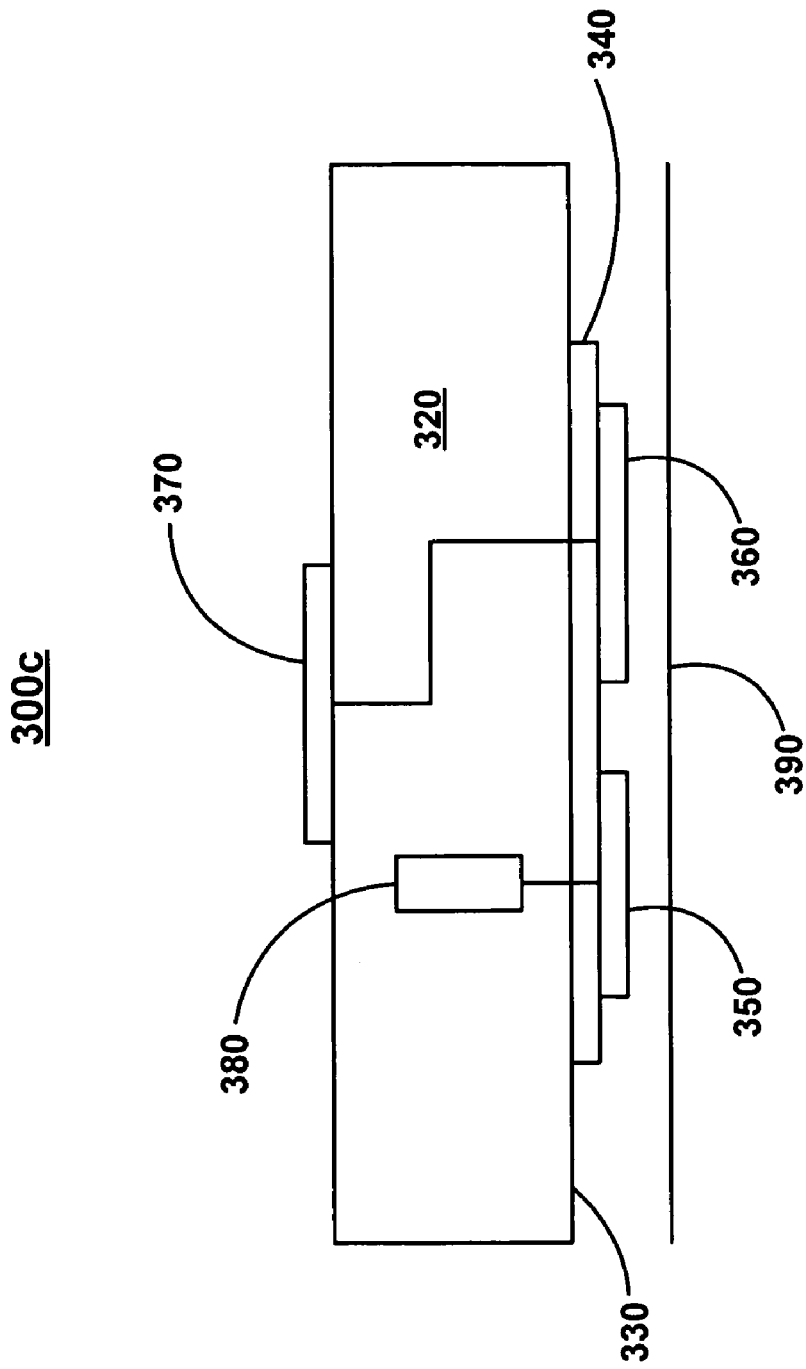
FIG. 3C is an illustration of an end elevation view of an exemplary combination glide/burnish slider of FIG. 3B, according to an embodiment of the present invention.

Referring now to FIGS. 3A, 3B and 3C, FIG. 3A is an illustration of a top view 300*a* of an exemplary disk 115 on a test stand (not shown) having a single suspension 310 with a combination glide/burnish slider located at the distal end 320 of suspension 310, in accordance with one embodiment of the present invention. FIG. 3B is an illustration of a bottom view 300*b* of an exemplary combination glide/burnish slider 340, in accordance with one embodiment of the present invention. FIG. 3C is an illustration of an end elevation view 300*c* of an exemplary combination glide/burnish slider 340 of FIG. 3B, according to an embodiment of the present invention. FIGS. 3A, 3B and 3C are discussed in concert below.

Referring to FIGS. 3A, 3B and 3C, a combination burnish/glide slider 340 is located at the distal end 320 of suspension 310 for selectively sensing and removing asperities from a hard disk drive media 115 utilizing thermal flying height, according to one embodiment of the present invention.

A glide pad 360 is coupled to the combination burnish/glide slider 340 and the combination burnish/glide slider 340 is coupled to a suspension 310 mounted on a spin stand, in accordance with one embodiment. A PZT sensor 370 is coupled to glide pad 360 for sensing and mapping asperities on a surface of hard disk drive media 115. PZT sensor 370 can be located on the non-air-bearing surface of distal end 320 of suspension 310.

Referring still to FIGS. 3A, 3B and 3C, according to one embodiment of the present invention, a burnish pad 350 is coupled to combination burnish/glide slider 340 for wearing-away any sensed and mapped asperities on the surface of hard disk drive media 115 found by glide pad 360 and sensed and mapped by PZT sensor 370. Burnish pad 350 may be comprised of a strip of burnishing material overlaying a material (e.g., tungsten) having a high coefficient of thermal expansion, the material comprising a component of a thermal flying height actuator 380. Thermal flying height actuator 380 is coupled to burnish pad 350 for protruding burnish pad 350 when it is proximate to a mapped asperity.

According to one embodiment, thermal flying height actuator 380 comprises a heater and the material underlying burnish pad 350. Thermal flying height actuator 380 can heat the underlying material causing it to expand and protrude burnish pad 350 when it is proximate to a mapped asperity. When protruded, burnish pad 350 is lowered to a height (e.g., line 390) that allows it to wear-away the proximate mapped asperity. Utilizing the principle of temperature controlled actuation, the flying height of burnish pad 350 can be adjusted to any value desired relative to the desired glide height for removing asperities on the surface of hard disk drive media 115 that would cause a glide reject of the quality of the hard disk drive media 115 surface.

By only protruding burnish pad 350 when it is proximate to a mapped location of an asperity, the thermal flying height actuator 380 facilitates the selective wearing-away of the mapped asperity and avoids the necessity of burnishing the entire surface of hard disk drive media 115, thereby avoiding potential deleterious effects that might result from adhesion and subsequent skipping and bouncing of burnish pad 350 on the surface of hard disk drive media 115.

According to one embodiment, burnish pad 350 is flown over the surface of hard disk drive media with thermal flying height actuator 380 deactivated for removing loose particles from the surface.

In one embodiment, a second thermal flying height actuator, such as thermal flying height actuator 380, may be provided for protruding glide pad 360. This embodiment could facilitate the protrusion of glide pad 360 for locating asperities while allowing for retracting glide pad 360 during the wearing-away of the asperities by burnishing pad 350, thereby reducing contamination of glide pad 360.

In one embodiment, combination burnish/glide slider 340 resides on a spin stand having a second combination burnish/glide slider that is mounted so as to simultaneously sense, map and remove asperities on both surfaces of the hard disk drive media 115.

Figure 4:
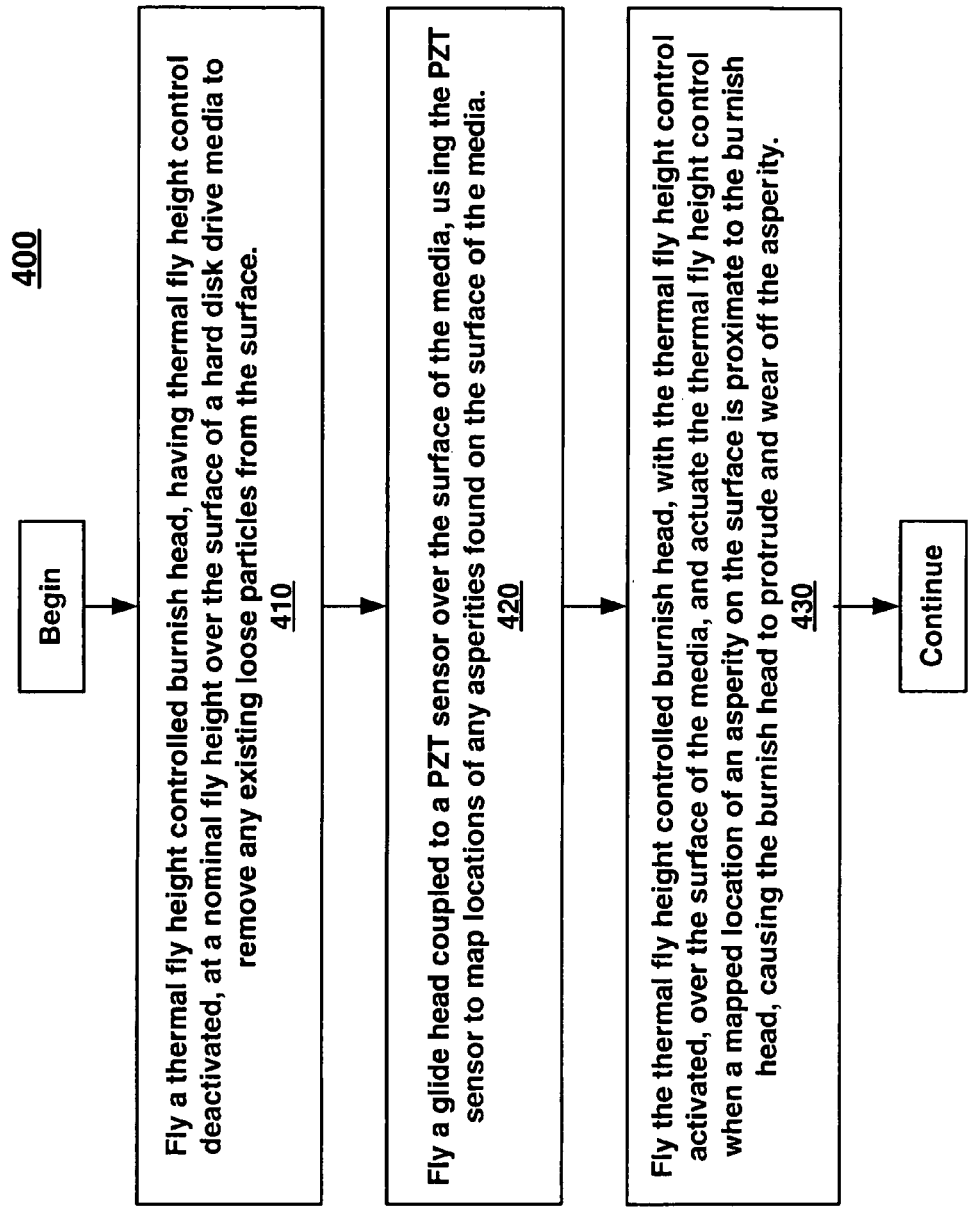
FIG. 4 is a flowchart of a method for selectively sensing and removing asperities from hard disk drive media utilizing active thermally controlled flying heights, in accordance with one embodiment of the present invention.

FIG. 4 is a flowchart of a method 400 for selectively sensing and removing asperities from hard disk drive media utilizing active thermally controlled flying heights, in accordance with one embodiment of the present invention. Method 400 is described in conjunction with FIGS. 3A, 3B and 3C. Method 400 is performed on the hard disk drive media on a test stand, also sometimes referred to as a spin stand. According to one embodiment, method 400 is performed in its entirety in one spin stand. In another embodiment, different spin stands may be used for various steps of method 400.

At step 410 of method 400, in accordance with one embodiment, a thermal flying height controlled burnish slider (e.g. burnish slider 350), having thermal flying height actuator (e.g. flying height actuator 380) deactivated, is flown at a nominal flying height over the surface of a hard disk drive media (e.g., disk 115). The object of this step is to remove any existing loose particles from the surface of the disk 115. The nominal flying height may be, for example, approximately 10 nm.

At step 420 of method 400, according to one embodiment, a glide slider (e.g., glide slider 360) coupled to a PZT sensor (e.g., PZT sensor 370) is flown over the surface of the hard disk drive media, the PZT sensor mapping locations of any asperities found on the surface. In another embodiment, when glide slider 360 and burnish slider 350 reside together as a combination burnish/glide slider, glide slider 360 may also be coupled to a thermal flying height actuator. In this case, the glide pad on the combination head can be protruded when flown over the disk for sensing asperities, and subsequently retracted when the burnish pad is wearing-away the asperities, thus protecting the glide slider from contamination.

At step 430 of method 400, in accordance with one embodiment, the thermal flying height controlled burnish slider, with its thermal flying height actuator activated, is flown over the surface of the hard disk drive media. When a mapped location of an asperity on the surface is proximate to the burnish slider, the thermal flying height controller is actuated, causing the burnish slider to protrude and wear off the asperity. Therefore, by only protruding burnish pad 350 when it is proximate to a mapped location of an asperity, the thermal flying height actuator 380 facilitates the selective wearing-away of the mapped asperity and avoids the necessity of burnishing the entire surface of hard disk drive media 115, thereby avoiding potential deleterious effects that might result from adhesion and subsequent skipping and bouncing of burnish pad 350 on the surface of hard disk drive media 115.

Once step 430 is completed, according to one embodiment, the disk, or hard disk drive media 115, may be flipped on the test stand to expose the second surface to the burnish and glide sliders, and method 400 repeated on the second surface. In another embodiment, there are dual sets of heads configured such that method 400 is simultaneously performed on both surfaces of disk 115.

Figure 5:
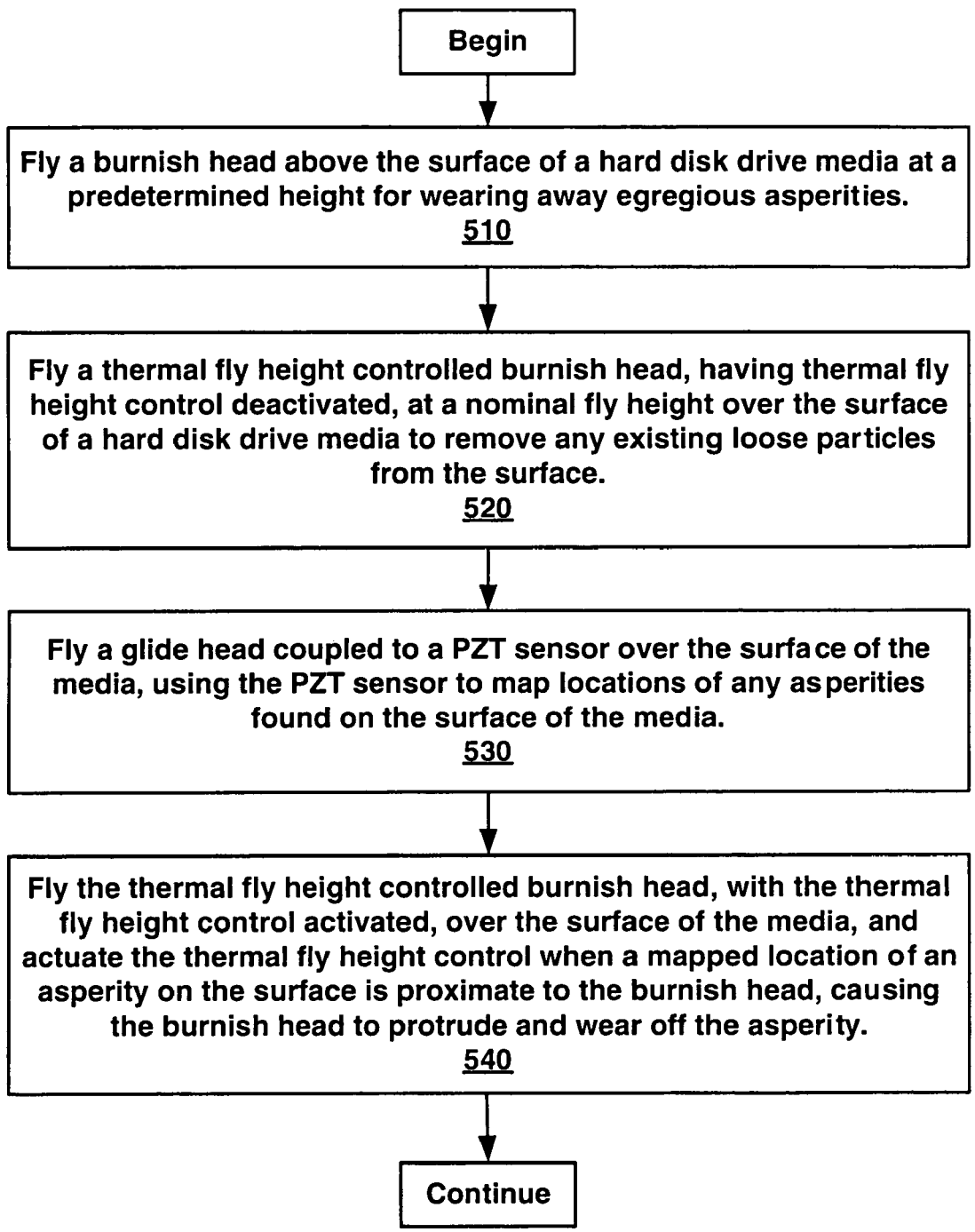
FIG. 5 is a flowchart of a method for selectively sensing and removing asperities from hard disk drive media utilizing active thermally controlled flying heights, in accordance with another embodiment of the present invention.

FIG. 5 is a flowchart of a method 500 for selectively sensing and removing asperities from hard disk drive media utilizing active thermally controlled flying heights, in accordance with another embodiment of the present invention. Method 500 is described in conjunction with FIGS. 2A, 2B and 2C. Method 500 is performed on the hard disk drive media on a test stand, also sometimes referred to as a spin stand. According to one embodiment, method 500 is performed in its entirety in one spin stand. In another embodiment, different spin stands may be used for various steps of method 500.

At step 510 of method 500, in accordance with one embodiment of the present invention, a burnish slider (e.g., burnish slider 242) is flown above the surface of a hard disk drive media (e.g., disk 115) at a predetermined height for wearing-away egregious asperities. This step may be performed at technician request and the predetermined height may be determined based on technician apriori knowledge of existing egregious asperities. This step in method 500 is known in the art as a soft first pass burnish. This step may be performed in one embodiment with a thermal flying height controlled burnish slider having the thermal flying height actuator deactivated. In another embodiment, this step may be performed with a conventional burnish slider. In yet another embodiment, this step may be performed with a thermal flying height controlled burnish slider having the thermal flying height actuator activated.

At step 520 of method 500, in accordance with one embodiment, a thermal flying height controlled burnish slider (e.g. burnish slider 242), having thermal flying height actuator (e.g. flying height actuator 248) deactivated, is flown at a nominal flying height over the surface of a hard disk drive media (e.g., disk 115). The object of this step is to remove any existing loose particles from the surface of the disk 115. The nominal flying height may be, for example, approximately 10 nm.

At step 530 of method 500, according to one embodiment, a glide slider (e.g., glide slider 222) coupled to a PZT sensor (e.g., PZT sensor 228) is flown over the surface of the hard disk drive media, the PZT sensor mapping locations of any asperities found on the surface. In another embodiment, when glide slider 222 and burnish slider 242 reside together as a combination burnish/glide slider, (e.g., burnish/glide slider 340 of FIG. 3B) the glide pad 360 may also be coupled to a thermal flying height actuator. In this case, the glide pad on the combination head can be protruded when flown over the disk for sensing asperities, and subsequently retracted when the burnish pad is wearing-away the asperities, thus protecting the glide slider from contamination.

At step 540 of method 500, in accordance with one embodiment, the thermal flying height controlled burnish slider, with its thermal flying height actuator activated, is flown over the surface of the hard disk drive media. When a mapped location of an asperity on the surface is proximate to the burnish slider, the thermal flying height actuator is actuated, causing the burnish slider to protrude and wear off the asperity. Therefore, by only protruding burnish pad 245 when it is proximate to a mapped location of an asperity, the thermal flying height actuator 248 facilitates the selective wearing-away of the mapped asperity and avoids the necessity of burnishing the entire surface of disk 1115, thereby avoiding potential deleterious effects that might result from adhesion and subsequent skipping and bouncing of burnish pad 245 on the surface of disk 115.

Once step 540 is completed, according to one embodiment, the disk, or hard disk drive media 115, may be flipped on the test stand to expose the second surface to the burnish and glide sliders, and method 500 repeated on the second surface. In another embodiment, there are dual sets of heads configured such that method 500 is simultaneously performed on both surfaces of disk 115.

Figure 6:
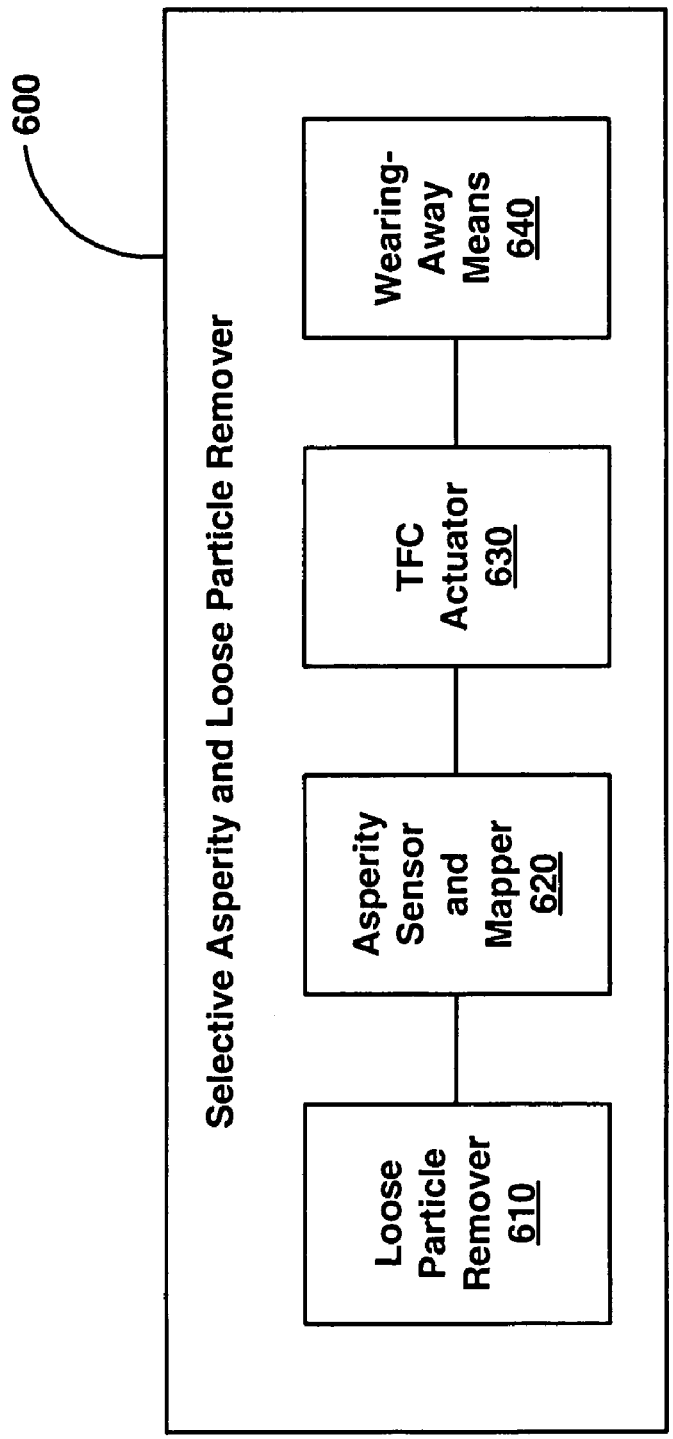
FIG. 6 is a block diagram of a loose particle and asperity remover, in accordance embodiment of the present invention.

FIG. 6 is a block diagram of a selective asperity and loose particle remover 600, in accordance with one embodiment of the present invention. Selective asperity and loose particle remover 600 has loose particle remover 610 for removing loose particles that may be present on the surface of a hard disk drive disk (e.g., disk 115 of FIG. 3A). Loose particle remover 610 is flown over disk 115 to attract and remove any existing loose particles from the surface of disk 115. According to one embodiment, loose particle remover 610 may be a thermal flying height controlled burnish slider residing on a slider (e.g., burnish slider 242 of FIG. 2) with thermal flying height control deactivated. According to another embodiment, loose particle remover 610 may be a thermal flying height controlled burnish pad (e.g., burnish pad 350 of FIG. 3C) residing on a combination burnish/glide slider with thermal flying height control deactivated. In yet another embodiment, loose particle remover 610 may be a conventional burnish head.

According to one embodiment of the present invention, asperity sensor and mapper 620 is coupled with loose particle remover 610 for sensing and mapping asperities on the surface of disk 115. According to one embodiment, asperity sensor and mapper 620 may be used for locating and mapping the location of asperities for future use by a thermal flying height actuator. According to another embodiment, asperity sensor and mapper 620 may be a glide pad (e.g., glide pad 360 of FIG. 3C) residing on a combination burnish/glide slider coupled to a PZT sensor. Asperity sensor and mapper 620 residing on a combination burnish/glide slider may, according to one embodiment, also be coupled to a thermal flying height actuator.

In accordance with one embodiment, a thermal flying height control (TFC) actuator 630 is coupled with asperity sensor and mapper 620. TFC actuator is for selectively actuating a thermal flying height control apparatus to protrude a wearing-away means 640 when sensed and mapped asperities are proximate, based on information from asperity sensor and mapper 620. TFC actuator 640 may be, according to one embodiment, an electrical heater coupled to a material having a high coefficient of thermal expansion (e.g., nickel, tungsten, etc.).

Still referring to FIG. 6, in accordance with embodiments of the present invention, wearing-away means 640 is coupled to TFC actuator 630. In one embodiment, wearing-away means 640 is a burnish pad, such as burnish pad 245 of FIG. 2C, coupled to the material having a high coefficient of thermal expansion that comprises a portion of TFC actuator 640, residing on a burnish slider. In another embodiment, wearing-away means 640 is a burnish pad coupled to the material having a high coefficient of thermal expansion that comprises a portion of TFC actuator 640, residing on a combination burnish/glide slider such as burnish pad 350 of FIG. 3C. Wearing-away means 640 is only protruded when TFC actuator, based on information from asperity sensor and mapper 620, determines that wearing-away means 640 is proximate to a mapped asperity. Thus, by only protruding wearing-away means 640 when it is proximate to a mapped location of an asperity, the TFC actuator 630 facilitates the selective wearing-away of the mapped asperity and avoids the necessity of burnishing the entire surface of a hard disk drive media. This selective wearing-away avoids potential deleterious effects that might result from adhesion and subsequent skipping and bouncing of wearing-away means 640 on the surface of hard disk drive media.

What is claimed is:

1. A system for selectively sensing and removing asperities from hard disk drive media, comprising:
   at least one test stand supporting said hard disk drive media, said at least one test stand comprising at least one suspension for flying over a surface of said hard disk drive media;
   a glide pad coupled to one said at least one suspension for said flying over said surface and locating asperities;
   a PZT sensor coupled to said glide pad for sensing and mapping asperities on said surface of said hard disk drive media;
   a burnish pad coupled to one said at least one suspension for wearing-away said sensed and mapped asperities on said surface of said hard disk drive media; and
   a thermal flying height actuator coupled to said burnish pad for protruding said burnish pad when said burnish pad is proximate to one of said mapped asperities, said protruding for facilitating said wearing-away of said one of said mapped asperities.

2. The system as described in claim 1, wherein said burnish pad is flown over said surface of said hard disk drive media with said thermal flying height actuator deactivated for removing loose particles from said surface.

3. The system as described in claim 1 wherein said at least one suspension is comprised of a single combination burnish/glide slider comprising said glide pad and said burnish pad.

4. The system as described in claim 3 wherein said glide pad is coupled to a thermal flying height actuator for protruding said glide pad to locate asperities and for retracting said glide pad during said wearing-away of said asperities by said burnishing pad to reduce contamination of said glide pad.

5. The system as described in claim 1 wherein said at least one suspension is comprised of a first suspension and a second suspension, said first suspension comprising a glide slider coupled to said glide pad and said second suspension comprising a burnish slider coupled to said burnish pad.

6. The system as described in claim 5 wherein said first suspension is on a first said at least one test stand and said second suspension is on a second said at least one test stand.

7. The system as described in claim 1, wherein said PZT sensor is coupled to a non-air-bearing surface of said at least one suspension.

8. The system as described in claim 1 wherein, during a single test cycle, said at least one suspension comprises a slider for selectively sensing and removing asperities from a single said surface of said hard disk drive media.

9. The system as described in claim 1 wherein, during a single test cycle, a first said at least one suspension comprises a slider for selectively sensing and removing asperities from a first said surface of said hard disk drive media and a second said at least one suspension comprises a slider for selectively sensing and removing asperities from a second, reverse surface of said hard disk drive media.

10. A spin stand for testing and selectively sensing and removing asperities from hard disk drive media, comprising:
- at least one suspension for flying over a surface of said hard disk drive media;
- a glide pad coupled to one said at least one suspension for locating asperities on said surface;
- a PZT sensor coupled to said glide pad for sensing and mapping asperities on said surface of said hard disk drive media, said PZT sensor coupled to a non-air-bearing surface of said at least one suspension;
- a burnish pad coupled to one said at least one suspension for wearing-away said sensed and mapped asperities on said surface of said hard disk drive media; and
- a thermal flying height actuator coupled to said burnish pad for protruding said burnish pad when said burnish pad is proximate to one of said mapped asperities, said protruding for facilitating said wearing-away of said one of said mapped asperities.

11. The spin stand as described in claim 10, wherein said burnish pad is flown over said surface of said hard disk drive media with said thermal flying height actuator deactivated, for removing loose particles from said surface.

12. The spin stand as described in claim 10 wherein said at least one suspension is comprised of a single combination burnish/glide slider comprising said glide pad and said burnish pad.

13. The spin stand as described in claim 12 wherein said glide pad is coupled to a thermal flying height actuator for protruding said glide pad to locate asperities and for retracting said glide pad during said wearing-away of said asperities by said burnishing pad to reduce contamination of said glide pad.

14. The spin stand as described in claim 10 wherein said at least one suspension is comprised of a first suspension and a second suspension, said first suspension comprising a glide slider coupled to said glide pad and said second suspension comprising a burnish slider coupled to said burnish pad.

15. The spin stand as described in claim 10 wherein, during a single test cycle, said at least one suspension comprises a slider for selectively sensing and removing asperities from a single said surface of said hard disk drive media.

16. The spin stand as described in claim 10 wherein, during a single test cycle, a first of said at least one suspension comprises a slider for selectively sensing and removing asperities from a first said surface of said hard disk drive media and a second said at least one suspension comprises a slider for selectively sensing and removing asperities from a second, reverse surface of said hard disk drive media.

17. A combination burnish/glide slider for selectively sensing and removing asperities from a hard disk drive media utilizing thermally controlled flying heights, said combination burnish/glide slider comprising:
- a glide pad coupled to said combination burnish/glide slider and said combination burnish/glide slider coupled to a suspension mounted on a spin stand;
- a PZT sensor coupled to said glide pad for sensing and mapping asperities on a surface of a hard disk drive media, said PZT sensor coupled to a non-air-bearing surface of said suspension;
- a burnish pad coupled to said combination burnish/glide slider for wearing-away said sensed and mapped asperities on said surface of said hard disk drive media; and
- a thermal flying height actuator coupled to said burnish pad for protruding said burnish pad when said burnish pad is proximate to one of said mapped asperities, said protruding for facilitating said wearing-away of said one of said mapped asperities.

18. The combination burnish/glide slider of claim 17 wherein said thermal flying height actuator comprises a heater and a thermally expandable material.

19. The combination burnish/glide slider of claim 17 wherein said glide pad is coupled to a thermal flying height actuator for protruding said glide pad to locate asperities on said surface and for retracting said glide pad during said wearing-away of said asperities by said burnishing pad to reduce contamination of said glide pad.

20. The combination burnish/glide slider of claim 17 wherein said burnish pad is flown over said surface with said thermal flying height actuator deactivated for removing loose particles from said surface.

21. The combination burnish/glide slider of claim 17 wherein said spin stand comprises dual suspensions, each comprising one said combination burnish/glide slider, said dual suspensions mounted so as to simultaneously sense, map and remove asperities on both surfaces of said hard disk drive media.

* * * * *